United States Patent [19]

Burd

[11] 4,116,220
[45] Sep. 26, 1978

[54] SOLAR ENERGY COLLECTOR

[76] Inventor: David Miller Burd, 1841 R St. NW., Washington, D.C. 20009

[21] Appl. No.: 680,708

[22] Filed: Apr. 27, 1976

[51] Int. Cl.² .............................................. F24J 3/02
[52] U.S. Cl. .................................. 126/271; 126/270; 165/82; 165/67
[58] Field of Search ............. 126/270, 271; 237/1 A; 160/107, 184, 328, 329, 378; 165/18, 67, 81, 82, DIG. 4

[56] References Cited

U.S. PATENT DOCUMENTS

| 1,068,650 | 7/1913 | Harrison | 126/271 |
| 2,379,499 | 7/1945 | Smith | 160/378 |
| 3,176,679 | 4/1965 | Langley | 126/270 |
| 3,257,903 | 6/1966 | Marks | 126/270 |
| 3,342,244 | 9/1967 | Streeter, Jr. | 160/107 |
| 3,916,871 | 11/1975 | Estes et al. | 126/271 |
| 3,923,039 | 12/1975 | Falbel | 126/271 |
| 3,978,272 | 8/1976 | Donley | 126/270 |
| 3,981,445 | 9/1976 | Custer | 126/270 |

FOREIGN PATENT DOCUMENTS 71,213  10/1959  France ................................... 126/270

Primary Examiner—Kenneth W. Sprague
Assistant Examiner—James C. Yeung
Attorney, Agent, or Firm—John J. Gallagher

[57] ABSTRACT

A solar energy collector having an insulated enclosure with at least one transparent wall, a thin planar collecting member supported in the enclosure under peripheral tension and fluid means transmitting energy from the member.

9 Claims, 3 Drawing Figures

SOLAR ENERGY COLLECTOR

BACKGROUND OF THE INVENTION

Solar energy collectors are well-known in the art. They are varied in type but generally consist of devices which absorb the sun's energy, convert it to heat or directly to electrical energy and transmit the energy to a point of use or storage.

This invention relates to a heat type of energy collector and more particularly to a collector consisting of an insulated enclosure having a transparent wall with a "black body" planar heat collecting member therein such as is described in applicant's co-pending application, Ser. No. 659,259, filed Feb. 19, 1976.

In the prior art, economical construction of such solar energy collectors with large areas has been difficult to achieve. This is due, in part, to the large degree of expansion and contraction that takes place within the collector, particularly in the heat or energy absorbing member. To keep these dimensional changes within the bounds of simple and reliable construction the perimeter dimensions of the collectors have generally been kept small. This results in higher costs for a large total area since many small collectors must be used with an accompanying large sum of linear perimeter feet of all the individual collectors.

A major step toward reducing an installation cost is to reduce the number of collectors needed by using a small number of very large collectors in place of many small collectors. This can be achieved by designing the collector assembly so that its structural and functional integrity is not affected by the larger dimensional changes that inherently occur as the collector size increases.

This invention provides a technique for mounting large energy collecting members in solar energy collectors by using a single thin heat absorbing sheet attached to an outer frame with tension devices to maintain the member in a planar configuration, regardless of the dimensional state of the collecting member.

Where liquid is used to transmit the energy from the member, liquid will flow down the back surface of the planar member. The perimeter of the member must have attached a vapor-tight seal, in this case, to prevent moisture or moist vapor from reaching the volume of air in front of the sheet. Where a gas is used to transmit the energy the member must also be basically planar but may have thin heat exchanger fins attached to facilitate heat removal. Where a gas is used as a transmitter, internal type seals are not required. With the use of the proper materials and elastic tension hardware, the assembly size is limited only by handling and transportation requirements, thereby substantially reducing the cost of installation.

Utilization of an extremely thin sheet for a collecting member also provides benefits in that the cost of the collecting member is reduced (less material and standard, off-the-shelf stock may be used), extremely large collecting members can be transported in a rolled condition and selective surface coatings can be applied, where desired, in a continuous coating process rather than the batch coating processes now required with thick, rigid collecting members.

Since the member is essentially isolated from external forces by the surrounding frame and insulating enclosure of the collector, it need only be thick enough to have the strength to withstand the tensile load.

SUMMARY OF THE INVENTION

It is an object of this invention to provide an extremely thin planar solar energy collecting member by furnishing means to support the member in peripheral tension to maintain its planar configuration.

It is another object of the invention to furnish a solar energy collecting member which is not size limited by thermal expansion and contraction considerations, by providing freefloating support for said member through application of peripheral tension thereto under all conditions of thermal expansion and contraction.

It is yet another object of this invention to provide a solar energy collecting member in which energy transmitting fluid may sweep over the entire front and/or back surfaces thereof by furnishing peripheral tension support so that the planar surfaces thereof are unobstructed.

In a preferred embodiment, the invention comprises a sealed enclosure with a transparent, insulating front wall and insulating peripheral and back walls, a thin, planar collecting member mounted in spaced relation to the walls by tension devices between the peripheral edges of the member and the peripheral walls of the enclosure, and means to pass a fluid over the surfaces of the member to pick up and transmit energy collected thereby.

These and other objects of the invention will become better understood by those skilled in the art by reference to the drawings wherein like components throughout the Figures thereof are indicated by like numerals and wherein:

DESCRIPTION OF A PREFERRED EMBODIMENT

Figures 1, 2, 3:
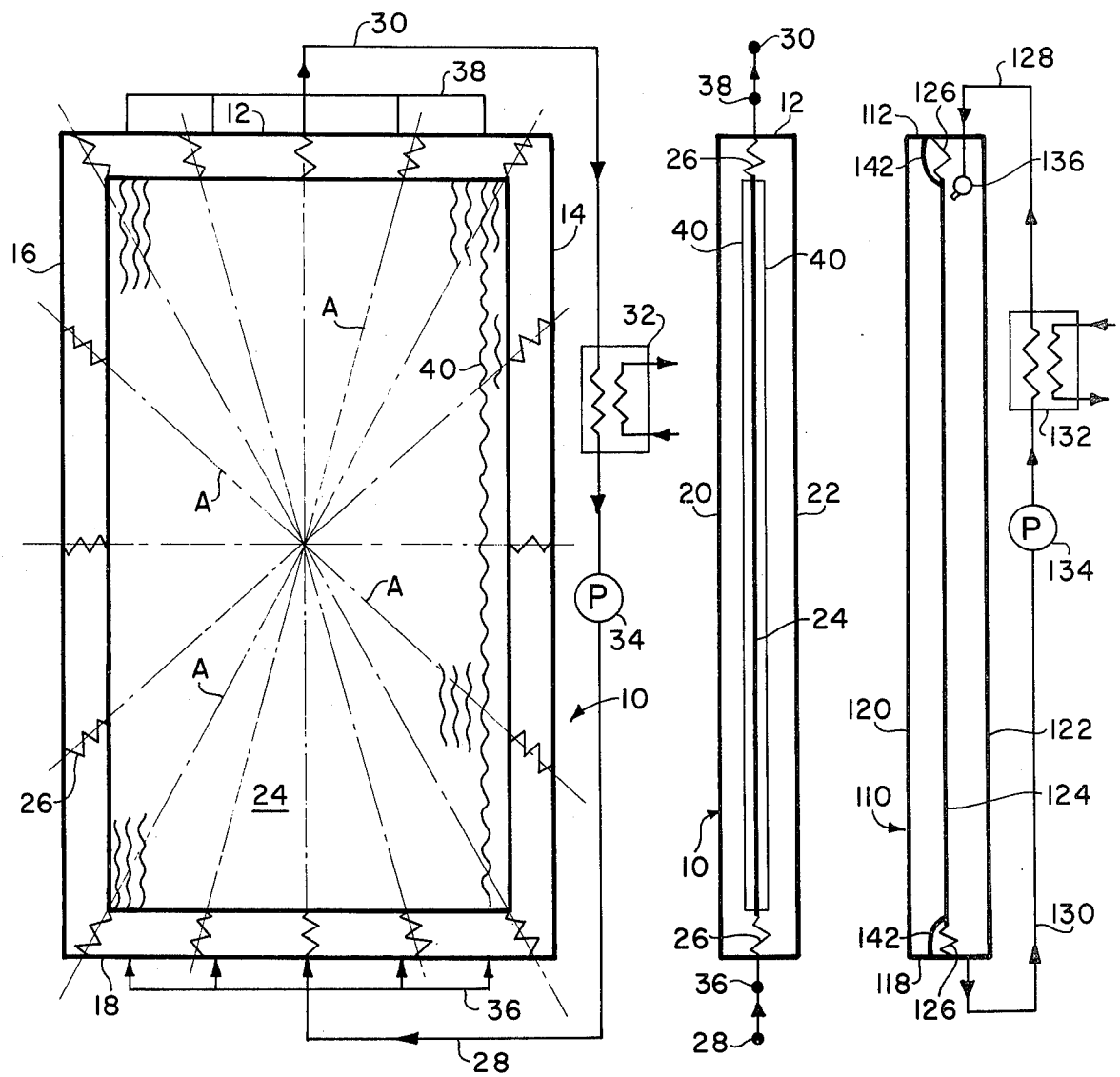
FIG. 1 is a schematic elevational view of a device in accordance with the invention.
FIG. 2 is a schematic side view of the device of FIG. 1.
FIG. 3 is a schematic side view of another embodiment in accordance with the invention.

In FIG. 1, the solar energy collector, shown generally at 10, comprises top, side and bottom peripheral walls 12, 14, 16 and 18 respectively to form a frame for the device. The frame may be rectangular, as illustrated, or may be oval, circular or otherwise formed as may be desired. Front and back walls 20 and 22 (FIG. 2) complete the structure forming an enclosure for the device. The walls are made of thermal insulating material with at least the front wall 20 being made of a transparent material such as glass or the like. As is known in the solar energy art, the efficiency of the device is dependent to a degree on the effectiveness of the insulation so that materials having a high thermal insulating capability are preferred. The transparent walls could be of double wall construction if the desired efficiency requires.

A collecting member 24, comprising a thin sheet of material, is disposed between and in parallel planar relationship to the front wall 20 and the back wall 22 in the collector 10. As is seen in FIG. 1, the member 24 is sized and disposed within the collector 10 so that there is space between the peripheral edges of the member and the peripheral walls 12, 14, 16 and 18. This space is sufficient to allow ample room for thermal expansion of the member 24 without mechanical interference by the surrounding walls and to provide for operation of peripheral tensioning devices as will be described hereinafter.

Tensioning means comprising a series of elastic devices 26 are connected between the peripheral walls 12, 14, 16 and 18 of the collector 10 and the peripheral edges of the member 24 to provide support for the member and to maintain that support under all conditions of thermal expansion and contraction. In this latter respect, expansion and contraction of the member 24 will take place generally along lines radiating from the centroid of the member as are indicated at A in FIG. 1. For this reason, the devices 26 should be oriented along lines radiating from the centroid of the member 24 so that the tension applied to the member is even and consistent over the periphery and under all conditions of expansion thereof. Spacing of the devices 26 should be regular and such that sufficient support is provided the member 24 to maintain it in as planar a condition as is possible regardless of the degree of expansion or contraction due to thermal condition.

As was stated above, the member 24 can be made of an extremely thin material since it need carry no load other than the tensile load imposed by the devices 26. For example, if the member 24 is formed of stainless steel, a thickness on the order of 3 mills is feasible. Aluminum sheeting would be on the order of 6 to 10 mills in thickness. In these instances, some load distributing structure, such, for example, as spotwelded structural tabs (not shown) on the member 24 could be used to provide attachment points for the devices 26.

The energy absorbing surface of the member 24, as is known in the art, will be of a highly absorptive character. In less expensive installations this would consist simply of a coating of black paint while in more sophisticated systems, it would comprise selective absorption coatings as is known in the art. As was discussed above, due to the thin character of the member 24 made possible by this invention, such coatings can be applied less expensively than heretofore possible by the continuous processes feasible with roll sheet materials.

The tension devices 26 can comprise a series of elastic springs, as shown, an elastic diaphragm, weight-applying pulley systems or any other means to apply a continuing outward tension to the peripheral edges of the member 24.

In FIG. 2 it is seen that an energy transfer system comprising an inlet conduit 28 communicating with the collector 10 through the lower wall 18, an outlet conduit 30 communicating through the top wall 12, a heat exchanger 32 and a pump or fan 34 are connected in series to provide means to pass a gaseous fluid over both sides of the member 24 to remove energy in the form of heat therefrom and transmit it to a point of utilization or storage (not shown) through the heat exhanger 32. In FIG. 1, it is best seen that the inlet and outlet conduits 28 and 30 communicate with the interior of the collector 10 through distributing mainifolds 36 and 38 respectively. These manifolds are preferably placed and/or configured to deliver and take up gas equally to both the front and back surfaces of the collecting member 24.

To increase the efficiency of heat exchange between the member 24 and the gas flowing thereover, a series of fins 40 can be attached to surfaces of the member as is known in the art. The gas used for transmitting energy from the collector 10 may be air or a gas having a high heat-retentive capacity such, for example, as one of the Freons (Dupont trademark for fluorocarbons). In the former case, the heat exchanger 32 could be omitted and the air transmitted directly to point of use or storage.

Where higher input of energy is desired, the back wall 22 can also be made transparent and the back surface of the collecting member can be coated as described above. In this variation, mirrors, prisms or other sunlight-directing means can be employed to direct sunlight to the front and back surfaces of the collecting member simultaneously.

In FIG. 3, another embodiment in accordance with the invention is illustrated. In this embodiment, components corresponding to like components in the embodiment of FIGS. 1 and 2 are indicated by like numerals, only of the next higher order.

The primary distinction of the embodiment of FIG. 3 over the preceding embodiments is that the fluid for transmitting energy from the collector 110 is a liquid rather than a gas.

The liquid, which can be water or a substance having a higher boiling point such as glycol or the like for higher temperature systems is applied to the member 124 through an inlet manifold 136 disposed at the top, back surface of the member. As is more fully described in applicant's aforementioned copending application, the liquid is dispersed over the back face of the collecting member 124 to form a film which substantially covers the entire back surface of the member to remove heat therefrom. The liquid is collected at the bottom of the collector 110 and circulated through the outlet manifold 138 to the heat exchanger 132 by the pump 134. Since the purity of the liquid in the energy transmitting system is important so that the liquid distribution system remains clear and the surface of the collecting member clean, it is advisable to use a closed circuit in the conduits 128 and 130, and collector 110. Energy therefore would usually be removed through the heat exchanger 132. In high temperature systems where a high boiling point liquid is used in the energy transmitting system, the collector can be designed to raise the liquid temperature substantially higher than the boiling point of water. In this case, the heat exchanger 132 can consist of a boiler for generating steam for production of power or transmission for heating, cooling or the like.

In the embodiment of FIG. 3, it is important that the front face and area forward of the collecting member 124 as well as the inside surface of the front wall 120 (not shown) be kept free from occlusion by liquid or liquid vapor from the liquid film on the back surface. To this end, the peripheral space between the peripheral edges of the collecting member 124 and the peripheral walls 112, 114, 116 and 118 is closed with a continuous liquid-tight, flexible seal 142 to isolate liquids in the rear area of the collector 110. The material of the seal should be such that it is compatible with the environment in the collector 110 and suitable flexible under all conditions to allow expansion and contraction of the member 124 without impeding its movement.

The member 124 is preferably a plain sheet of material, coated on the front face and of the type and thickness described for the embodiment of FIGS. 1 and 2. The back face need not be coated or treated in any way if the furnished surface is relatively smooth for the purpose of this invention.

In some instances, with gas energy transmission devices in accordance with the invention, it is feasible to mount plural collecting members in series one behind the other to increase the heat transfer area. This can be achieved by selectively coating the sunward face of the member with selective coatings with low emissivity (on the order of 0.2 for example) and the rearward faces away from the sun with coatings of high emissivity (on the order of 0.8 for example). In this manner, the first of the series of members absorbs the sun rays directly and heats up efficiently due to the efficient selective coating on the member surface facing the sun and then, when heated, readily emits radiation backward to the next succeeding panel through the highly emissive backcoating. This radiation is efficiently applied to the second-most member through its low emissivity selective coating on the forward face. When that member is heated up the radiation is similarly passed on through its emissive rearward coating to the next member, if any.

Gas energy transmission fluid is passed between the members to pick up and transmit the energy as in the aforedescribed embodiments.

What has been set forth above is intended as exemplary of teachings in accordance with the invention to enable those skilled in the art to practice the invention.

What is new and desired to be protected by Letters Patent of the United States is:

1. A solar energy collector comprising:
   front, back and peripheral insulating walls defining a sealed enclosure, at least said front wall being transparent;
   at least one thin planar collecting member having front and back surfaces and edges, said collecting member being disposed in said enclosure in spaced relationship to said walls;
   tension means associated with said peripheral walls and said edges to entirely support said member in a planar configuration under all conditions of thermal contraction and expansion thereof;
   and means to transmit energy collected by said member for utilization thereof.

2. A collector in accordance with claim 1 wherein said tension means comprises elastic means disposed between said peripheral walls and edges.

3. A collector in accordance with claim 2 wherein said elastic means comprises a plurality of tension springs.

4. A collector in accordance with claim 3 wherein said springs are disposed coaxial with lines radiating from the centroid of said collecting member.

5. A collector in accordance with claim 1 wherein said means to transmit energy comprises a system for passing a gas over said collecting member to remove heat therefrom and means communicative with said enclosure to remove heated gas therefrom and transmit cool gas thereto.

6. A collector in accordance with claim 5 further comprising heat transfer fins projecting from the surfaces of said collecting member.

7. A collector in accordance with claim 1 wherein said means to transmit energy comprises means to pass a liquid over the back surface of said collecting member.

8. A collector in accordance with claim 7 wherein said liquid is water.

9. A solar energy collector comprising:
   front, back and peripheral insulating walls defining a sealed enclosure, at least said front wall being transparent;
   plural planar collecting members having front and back surfaces, said members being disposed in parellel-planar spaced relationship to one another with said front surfaces disposed most proximate said transparent wall;
   said front surfaces having a selective coating of low radiation emissivity formed thereon;
   said back surfaces having a selective coating of high radiation emissivity formed thereon; and
   means to transmit energy collected by said members for utilization thereof.

* * * * *